United States Patent
Yabusaki

(10) Patent No.: US 11,899,991 B2
(45) Date of Patent: Feb. 13, 2024

(54) PRINTING SYSTEM, INFORMATION PROCESSING APPARATUS, AND NON-TRANSITORY COMPUTER READABLE MEDIUM FOR RESTRICTING IMAGE FORMING FOR SPEECH INPUT

(71) Applicant: FUJIFILM Business Innovation Corp., Tokyo (JP)

(72) Inventor: Ryoto Yabusaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/645,359

(22) Filed: Dec. 21, 2021

(65) Prior Publication Data
US 2023/0030024 A1  Feb. 2, 2023

(30) Foreign Application Priority Data
Jul. 28, 2021 (JP) .................................. 2021-123753

(51) Int. Cl.
G06F 3/12 (2006.01)
G10L 15/22 (2006.01)
G10L 15/30 (2013.01)

(52) U.S. Cl.
CPC ............ G06F 3/121 (2013.01); G06F 3/1239 (2013.01); G06F 3/1288 (2013.01); G10L 15/22 (2013.01); G10L 15/30 (2013.01); G10L 2015/223 (2013.01)

(58) Field of Classification Search
CPC . G06F 3/1219; G06F 3/1239; H04N 1/00925; H04N 1/2376; H04N 1/00403
USPC ................................................ 358/1.14, 1.15
See application file for complete search history.

(56) References Cited

U.S. PATENT DOCUMENTS

| | | | |
|---|---|---|---|
| 10,606,531 B2 | 3/2020 | Maruyama et al. | |
| 2016/0037009 A1* | 2/2016 | Ito ...................... | H04N 1/00403 358/1.14 |
| 2020/0249883 A1* | 8/2020 | Nakata .................. | G06F 3/1257 |
| 2021/0092243 A1* | 3/2021 | Katsuda ............. | H04N 1/00474 |
| 2022/0399018 A1* | 12/2022 | Ogawa ............... | H04N 1/00403 |

FOREIGN PATENT DOCUMENTS

JP     2019-83497 A    5/2019

* cited by examiner

Primary Examiner — Kent Yip
(74) Attorney, Agent, or Firm — Sughrue Mion, PLLC

(57) ABSTRACT

A printing system includes: a receiving unit that receives a first instruction given in response to speech input by a user and a second instruction given in response to input other than the speech input by the user, the first instruction and the second instruction each serving as an image forming instruction to form a processed image on a recording medium; a restriction unit that performs restriction of image forming in which the image is to be formed on the recording medium, the restriction being performed in response to the receiving unit receiving the first instruction; and a storage unit that stores the image subjected to the restriction of the image forming on the recording medium, the restriction being performed by the restriction unit.

12 Claims, 14 Drawing Sheets

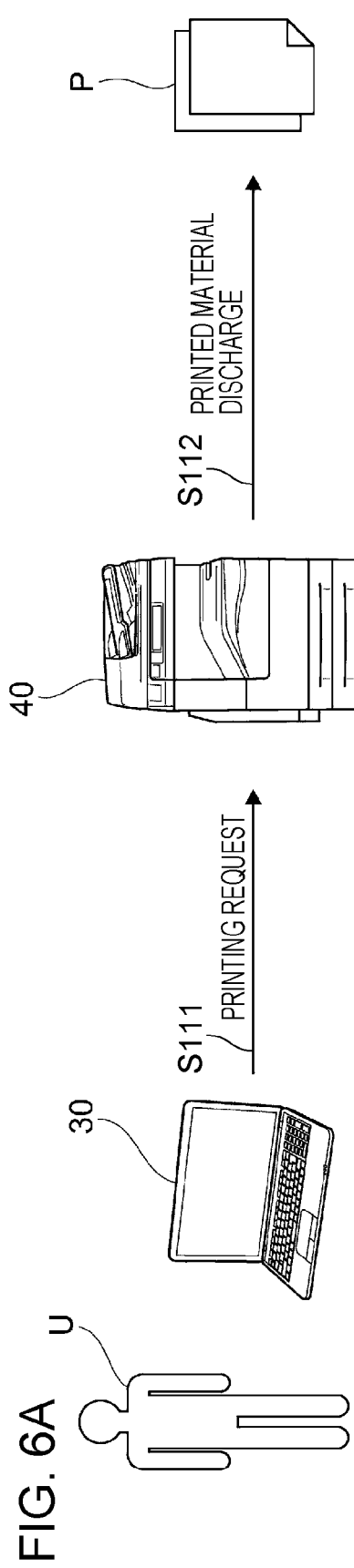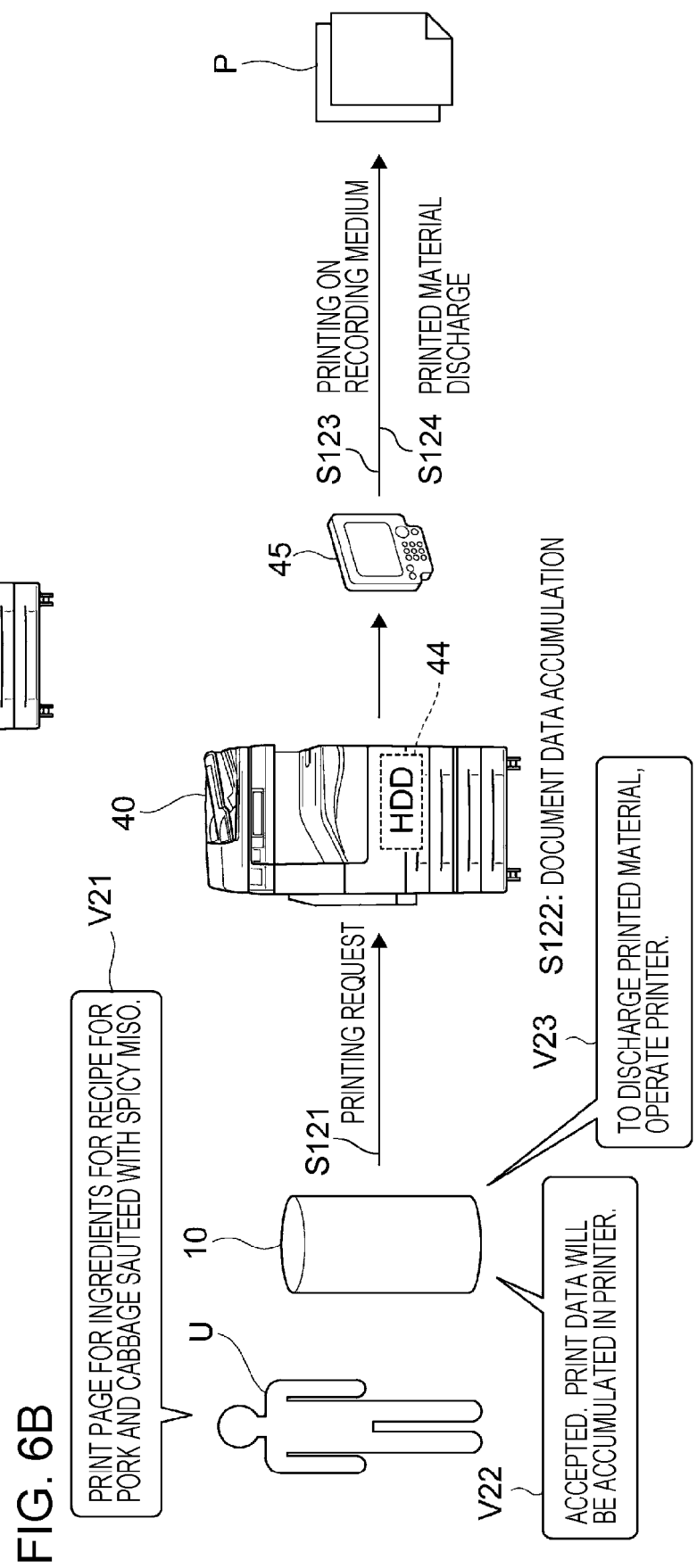

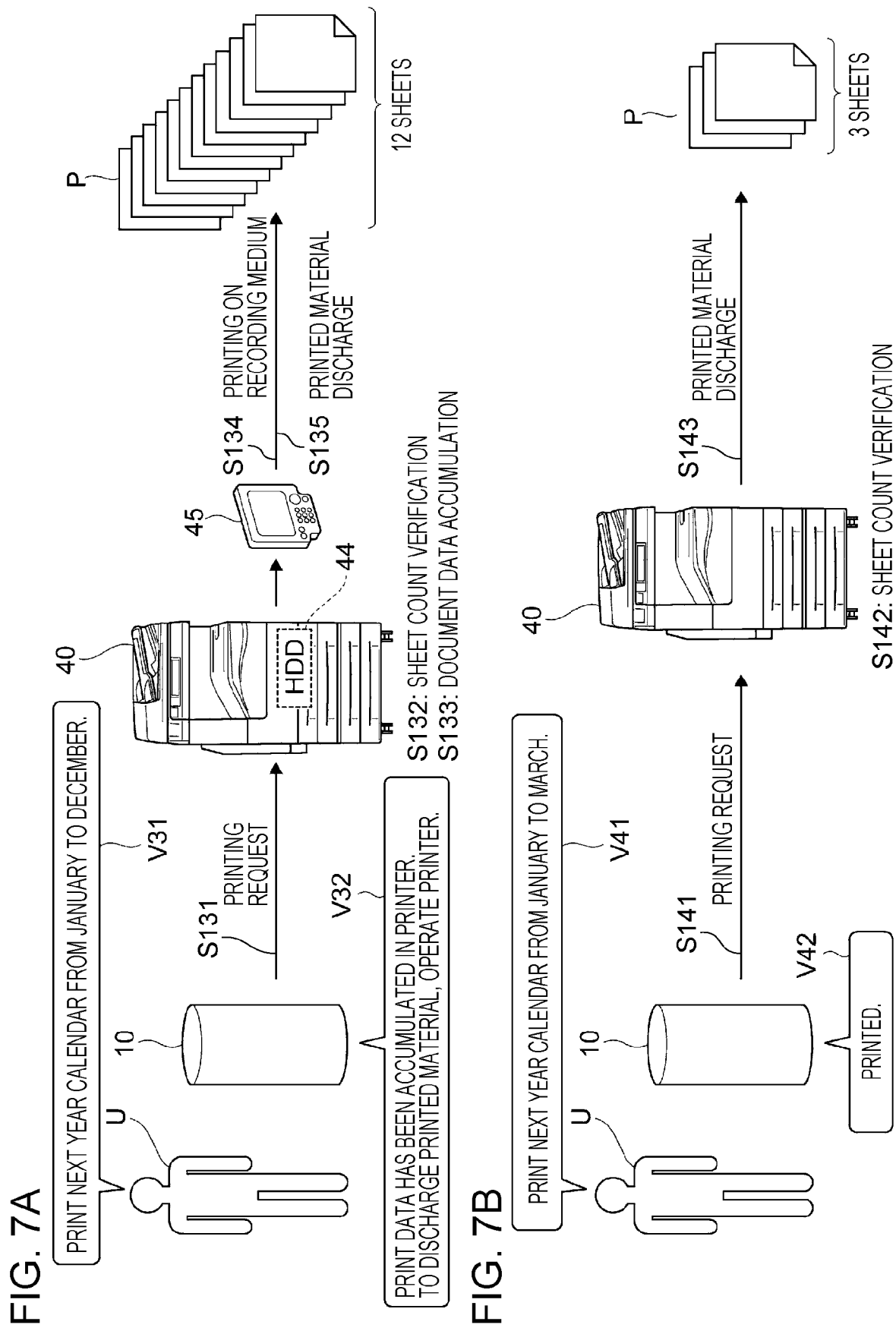

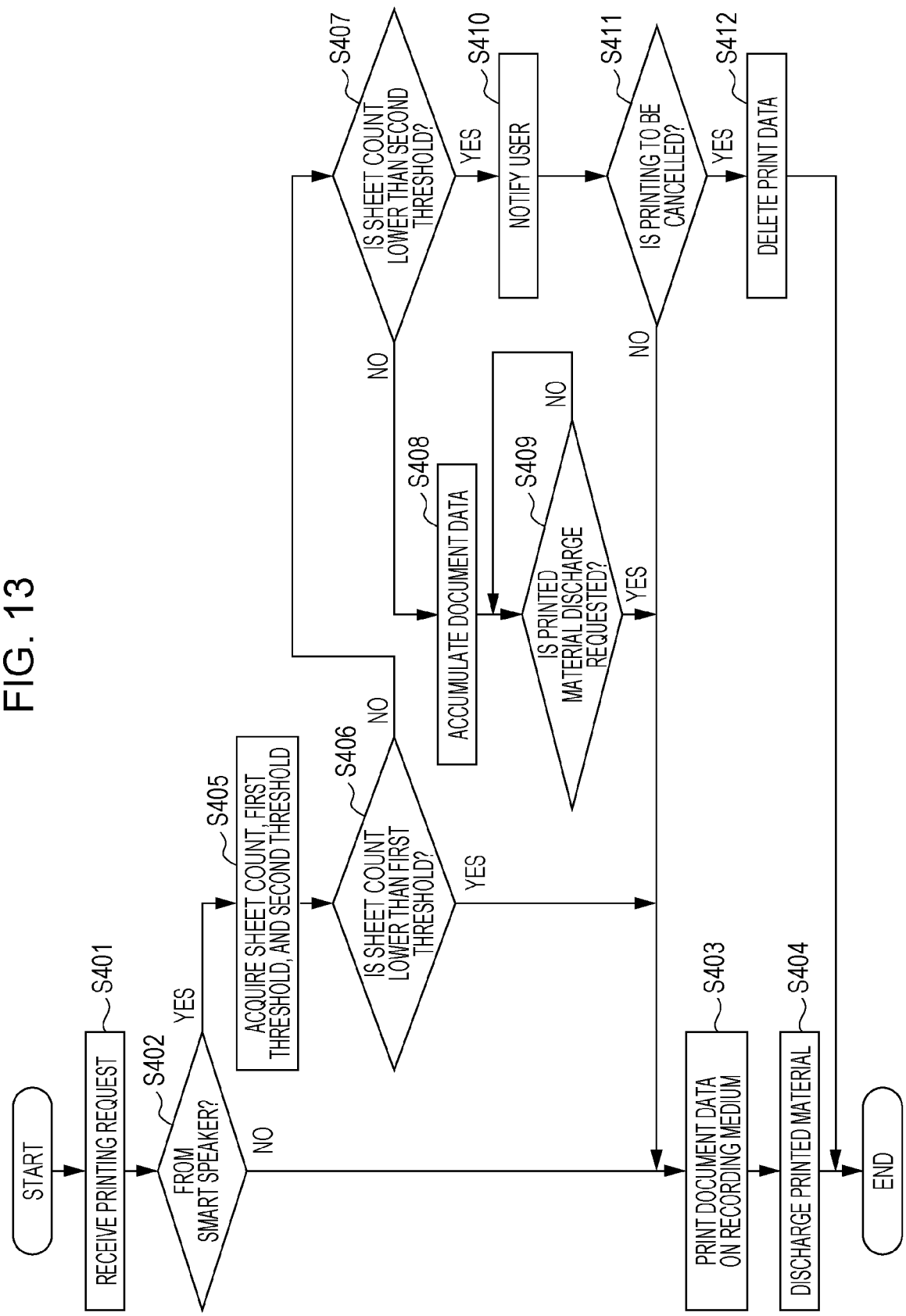

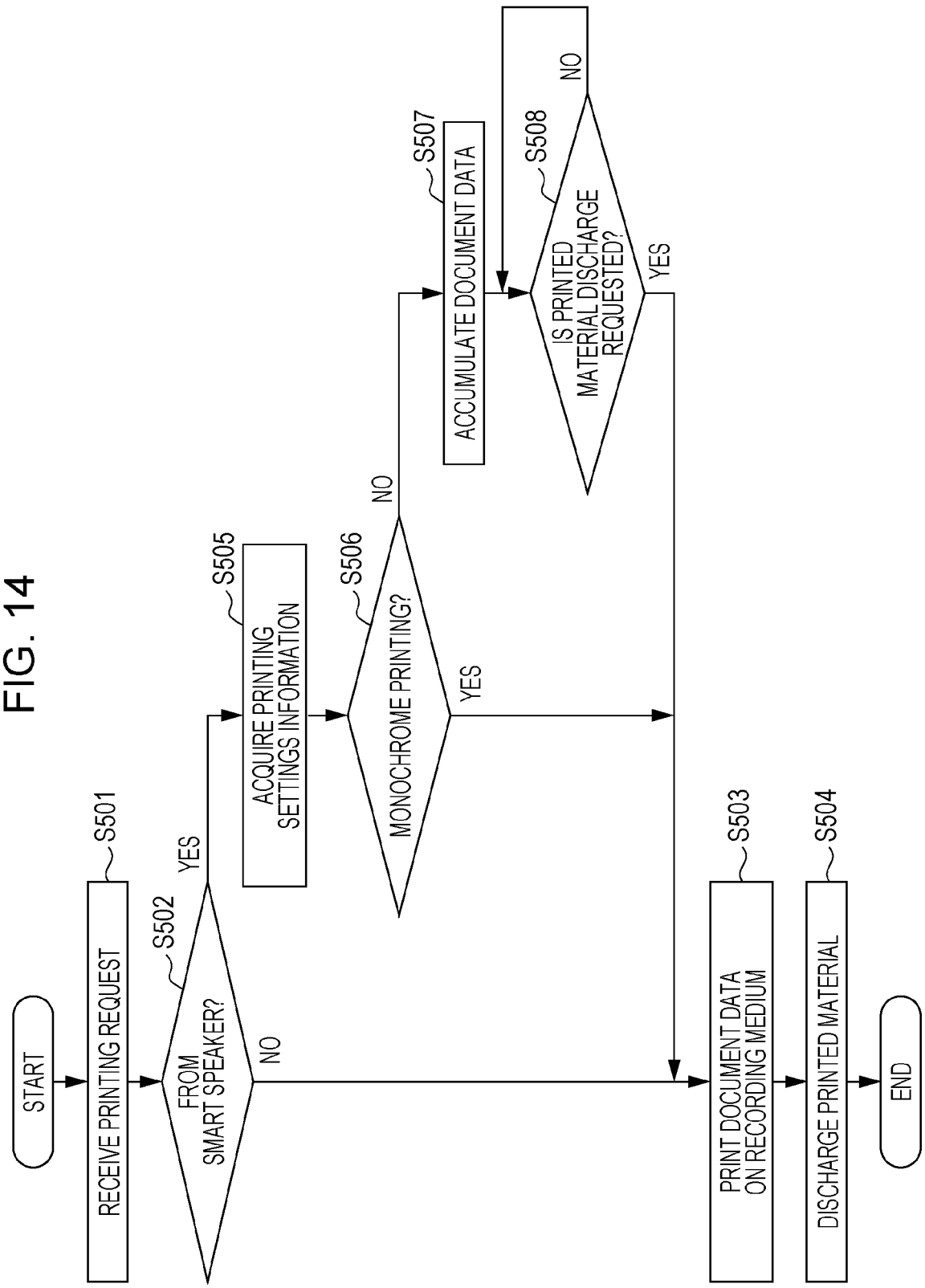

PRINTING SYSTEM, INFORMATION PROCESSING APPARATUS, AND NON-TRANSITORY COMPUTER READABLE MEDIUM FOR RESTRICTING IMAGE FORMING FOR SPEECH INPUT

CROSS-REFERENCE TO RELATED APPLICATIONS

This application is based on and claims priority under 35 USC 119 from Japanese Patent Application No. 2021-123753 filed Jul. 28, 2021.

BACKGROUND

(i) Technical Field

The present disclosure relates to a printing system, an information processing apparatus, and a non-transitory computer readable medium.

(ii) Related Art

For example, Japanese Unexamined Patent Application Publication No. 2019-083497 discloses an image processing apparatus capable of executing different types of jobs. The image processing apparatus includes a controller and a detection unit. The controller performs control of the execution of an input job. The detection unit detects the utterance of one of multiple predetermined target speeches on the basis of a speech detected by a sound detection unit. Time frames are set in advance by job type, and whether one of the target speeches is uttered in a predetermined time frame assigned to a job under execution is detected. In response to the detection of the target speech, the controller stops the execution of the job.

SUMMARY

Suppose a case where a printing instruction through speech input is available. If a user does not intend to perform printing, but if the printing is performed due to the occurrence of a speech given by mistake by the user, wrongly performed speech recognition, or the like, the unnecessary printing causes a waste of supplies.

Aspects of non-limiting embodiments of the present disclosure relate to preventing a waste of supplies compared with a case where an image forming instructions respectively given in response to speech input and input other than the speech input are processed in the same manner.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a printing system including: a receiving unit that receives a first instruction given in response to speech input by a user and a second instruction given in response to input other than the speech input by the user, the first instruction and the second instruction each serving as an image forming instruction to form a processed image on a recording medium; a restriction unit that performs restriction of image forming in which the image is to be formed on the recording medium, the restriction being performed in response to the receiving unit receiving the first instruction; and a storage unit that stores the image subjected to the restriction of the image forming on the recording medium, the restriction being performed by the restriction unit.

BRIEF DESCRIPTION OF THE DRAWINGS

An exemplary embodiment of the present disclosure will be described in detail based on the following figures, wherein:

FIGS. 6A and 6B each illustrate first example outline operations performed by the printing system in response to a printing request from a corresponding one of the PC and the smart speaker;

FIGS. 7A and 7B each illustrate second example outline operations performed by the printing system in response to a printing request from the smart speaker to discharge a corresponding one of cases where a printed material has 12 sheets and where a printed material has three sheets;

FIG. 13 is a flowchart illustrating third example operations of the server or the printer in this exemplary embodiment; and FIG. 14 is a flowchart illustrating fourth example operations of the server or the printer in this exemplary embodiment.

DETAILED DESCRIPTION

Hereinafter, an exemplary embodiment of the present disclosure will be described in detail with reference to the attached drawings.

Overview of this Exemplary Embodiment

According to this exemplary embodiment, there is provided a printing system that receives a first instruction given in response to speech input by a user and a second instruction given in response to input other than the speech input by the user. The first instruction and the second instruction each serve as an image forming instruction to form a processed image on a recording medium. In response to receiving the first instruction, the printing system performs restriction of the image forming on the recording medium and stores the image subjected to the restriction of the image forming.

In the printing system including a smart speaker that collects the user's speech and a printer that performs printing in response to an instruction from the smart speaker, any of the smart speaker and the printer may serve as an information processing apparatus. In the following description, a server as a relay between the smart speaker and the printer is provided and taken as an example of the information processing apparatus.

Overall Configuration of Printing System

Figure 1:
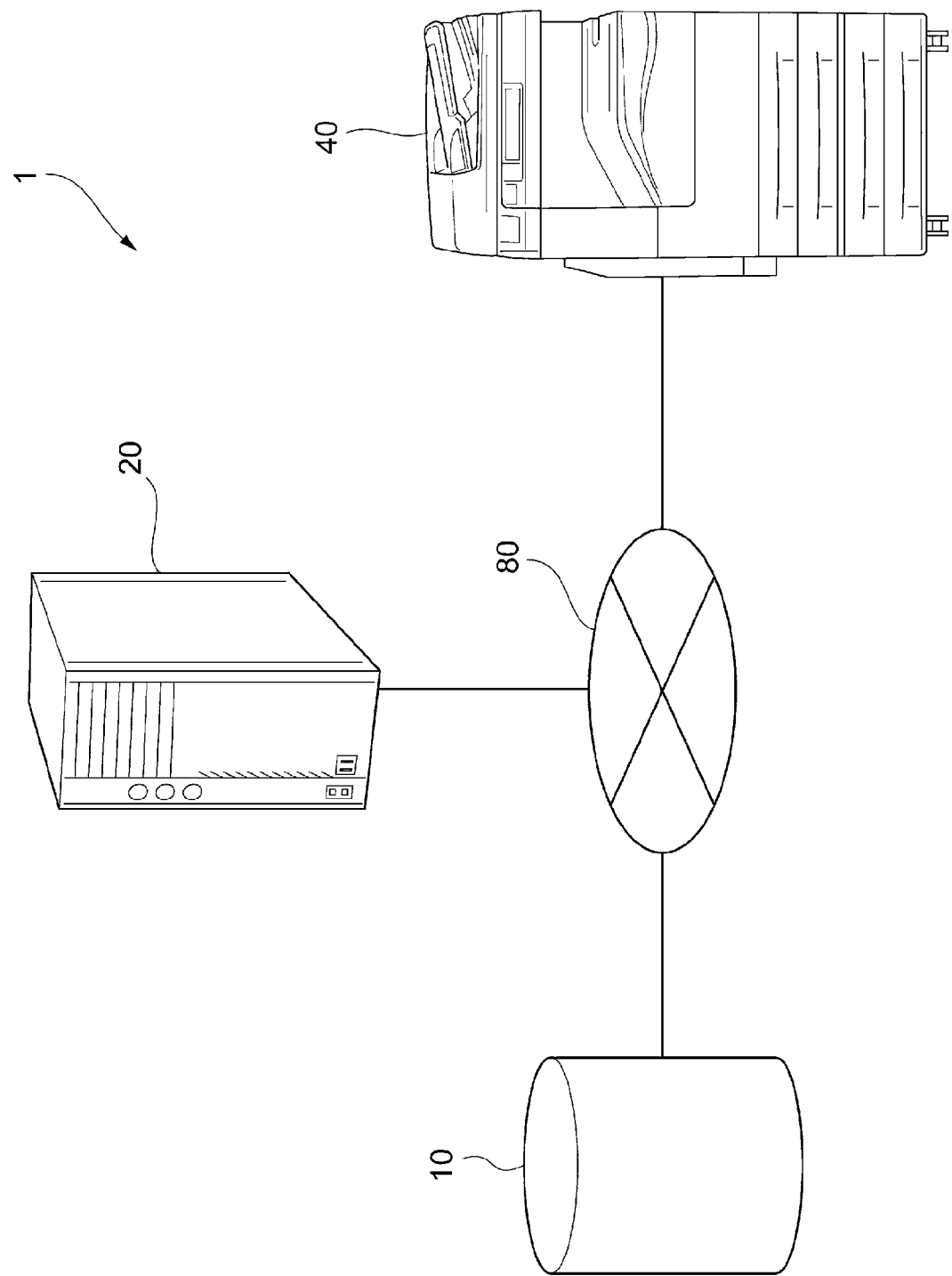
FIG. 1 is a diagram illustrating an example overall configuration of a printing system in this exemplary embodiment.

FIG. 1 is a diagram illustrating an example overall configuration of a printing system 1 in this exemplary embodiment. As illustrated in FIG. 1, the printing system 1 includes a smart speaker 10, a server 20, and a printer 40 that are connected to a communication network 80. Although one smart speaker 10, one server 20, and one printer 40 are illustrated in FIG. 1, two or more smart speakers 10, two or more servers 20, and two or more printers 40 may be provided.

The printing system 1 is an example of the printing system, the smart speaker 10 is an example of the apparatus that gives the first instruction, and the printer 40 is an example of an image forming apparatus.

The smart speaker 10 is a speaker with a speech assistant function that is capable of vocally answering a speech from the user after acquiring various pieces of information via the communication network 80 and also capable of controlling the operations of various devices. The smart speaker 10 is also called an AI speaker. In particular, in this exemplary embodiment, in response to the user making a printing request vocally, the smart speaker 10 performs speech recognition of the printing request, generates request information on the basis of the result of the speech recognition, and transmits the request information to the server 20.

The server 20 executes various processes on the basis of the information transmitted from the smart speaker 10. In particular, in this exemplary embodiment, the server 20 receives request information requesting printing from the smart speaker 10 and transmits a printing instruction based on the request information to the printer 40. In this exemplary embodiment, the server 20 is provided as an example of the information processing apparatus.

The printer 40 prints an image on the recording medium such as a paper sheet. In particular, in this exemplary embodiment, the printer 40 prints an image on the recording medium on the basis of the printing instruction transmitted from the server 20.

The smart speaker 10 is a device outside the printer 40 in the configuration in this exemplary embodiment; however, the configuration of the present disclosure is not limited to this. A configuration in which the smart speaker 10 is a device inside the printer 40 may be used.

The communication network 80 is a network used for information communications between the smart speaker 10 and the server 20 and between the server 20 and the printer 40. For example, the Internet may be used as the communication network 80.

Hardware Configuration of Smart Speaker

Figure 2:
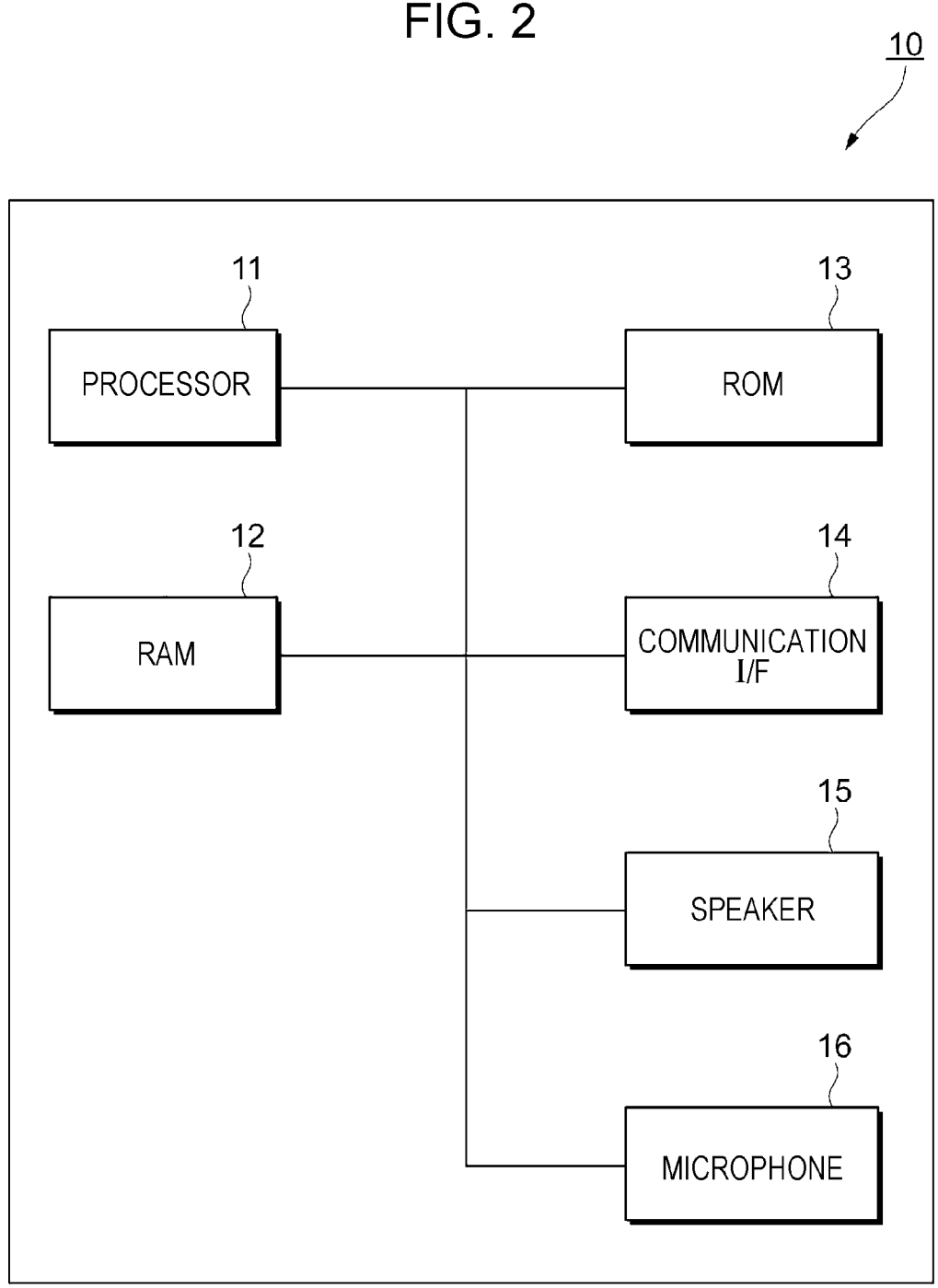
FIG. 2 is a diagram illustrating an example hardware configuration of a smart speaker in this exemplary embodiment.

FIG. 2 is a diagram illustrating an example hardware configuration of the smart speaker 10 in this exemplary embodiment. As illustrated in FIG. 2, the smart speaker 10 includes a processor 11, a random access memory (RAM) 12, a read only memory (ROM) 13, a communication interface (hereinafter, expressed as a communication I/F) 14, a speaker 15, and a microphone 16.

The processor 11 implements a process for inputting and outputting a speech by loading an appropriate one of various programs stored in the ROM 13 or the like into the RAM 12 and by running the program. Examples of the process include a process for generating speech data for outputting a speech from the speaker 15 and a process for performing speech recognition of a printing request speech collected through the microphone 16 and converting the speech to request information.

The RAM 12 is a memory used as the work memory or the like of the processor 11. The ROM 13 is a memory storing the various programs and the like to be run by the processor 11.

The communication I/F 14 transmits and receives various pieces of information to and from the server 20 via the communication network 80.

The speaker 15 outputs the speech based on the speech data generated by the processor 11 to the outside. The microphone 16 collects a speech given outside the microphone 16.

Hardware Configuration of Server

Figure 3:
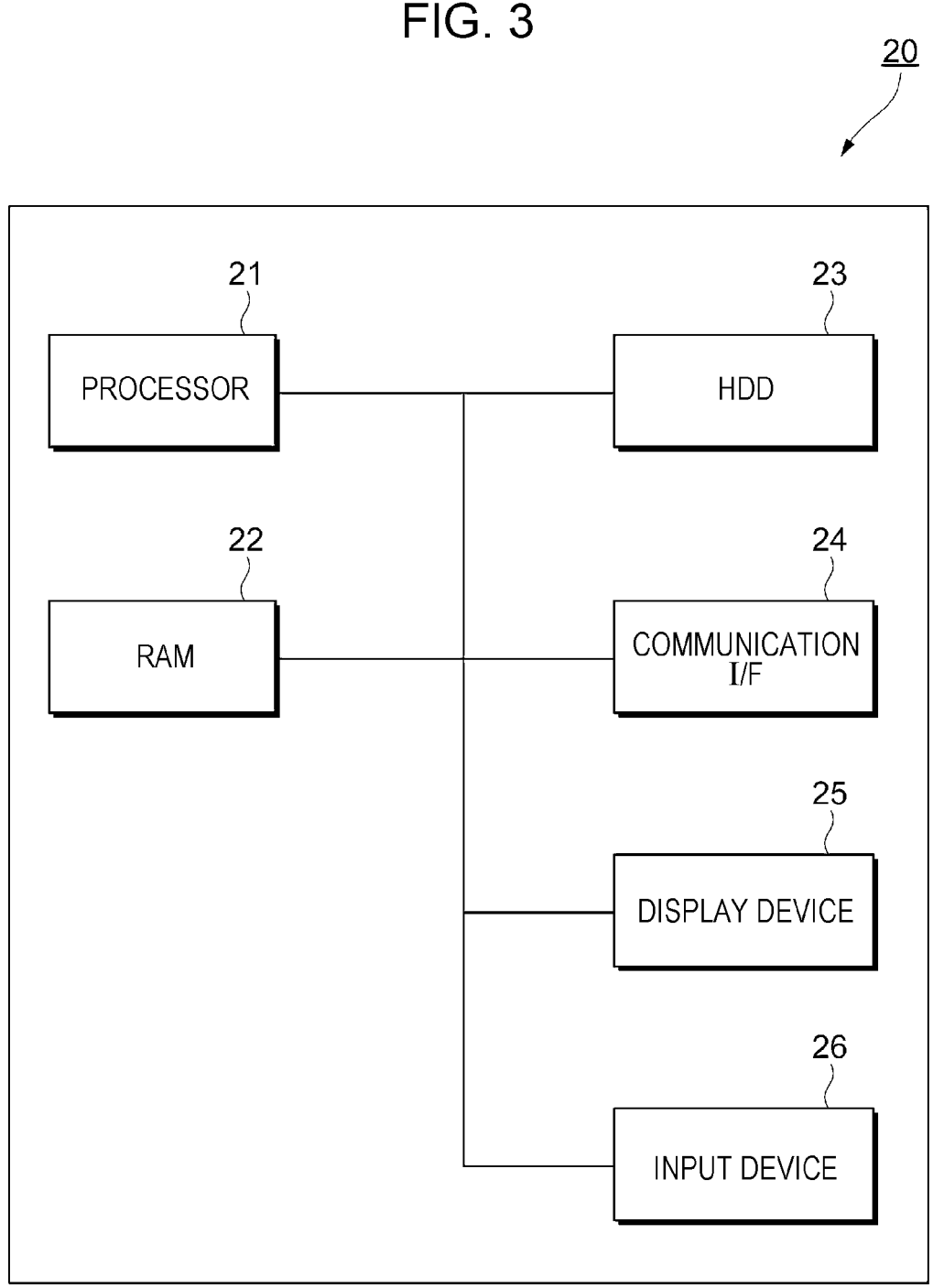
FIG. 3 is a diagram illustrating an example hardware configuration of a server in this exemplary embodiment.

FIG. 3 is a diagram illustrating an example hardware configuration of the server 20 in this exemplary embodiment. As illustrated in FIG. 3, the server 20 includes a processor 21, a RAM 22, a hard disk drive (HDD) 23, a communication I/F 24, a display device 25, and an input device 26.

The processor 21 runs various pieces of software such as the operating system (OS) and applications to implement functions (described later).

The RAM 22 is a memory used as the work memory or the like of the processor 21. The HDD 23 is, for example, a magnetic disk device storing input data for various pieces of software, output data from the various pieces of software, and the like.

The communication I/F 24 transmits and receives various pieces of information to and from the smart speaker 10 and the printer 40 via the communication network 80.

The display device 25 is, for example, a display that displays various pieces of information. The input device 26 is, for example, a keyboard or a mouse used to input information by the user.

Hardware Configuration of Printer

Figure 4:
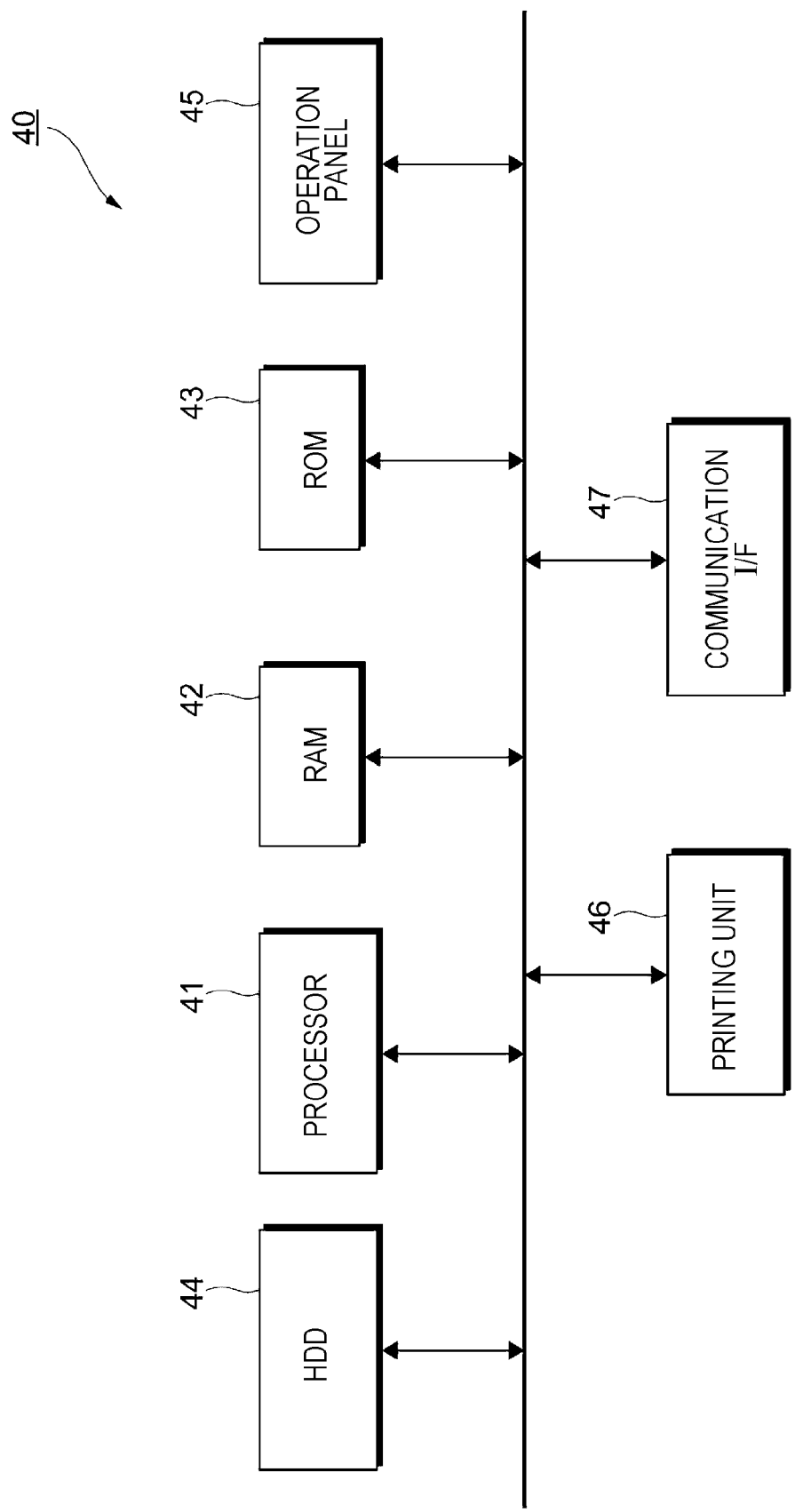
FIG. 4 is a diagram illustrating an example hardware configuration of a printer in this exemplary embodiment.

FIG. 4 is a diagram illustrating an example hardware configuration of the printer 40 in this exemplary embodiment. As illustrated in FIG. 4, the printer 40 includes a processor 41, a RAM 42, a ROM 43, a HDD 44, an operation panel 45, a printing unit 46, and a communication I/F 47.

The processor 41 implements a process for printing in the printing unit 46 by loading appropriate one of various programs stored in the ROM 43 or the like into the RAM 42 and by running the program.

The RAM 42 is a memory used as the work memory or the like of the processor 41. The ROM 43 is a memory storing the various programs and the like to be run by the processor 41. The HDD 44 is, for example, a magnetic disk device storing print data used for printing by the printing unit 46 and the like.

The operation panel 45 is, for example, a touch panel that displays various pieces of information and receives an input operation from the user. The operation panel 45 is a user interface (UI) device. The operation panel 45 is composed of a display on which various pieces of information are displayed and a location detection sheet on which a location instructed with an instruction instrument such as a finger or a stylus pen. Alternatively, a display and a keyboard may be used in place of the touch panel.

The printing unit 46 prints an image on the recording medium such as a paper sheet. The printing unit 46 is, for example, a printer, and an electrophotographic system or an inkjet system may be used. In the electrophotographic system, an image is formed by transferring toner adhered to a photoconductor onto the recording medium. In the inkjet system, an image is formed by discharging ink onto the recording medium.

The communication I/F 47 transmits and receives various pieces of information to and from the server 20 via the communication network 80.

Outline Operations of this Exemplary Embodiment

FIGS. 5 to 8 are each a diagram for explaining example outline operations in this exemplary embodiment. These figures illustrate a PC 30 and a document storage 50 that are omitted in FIG. 1 and a page analyzer 60 assumed to be included in the server 20 and thus not illustrated in FIG. 1 on occasions.

Figure 5:
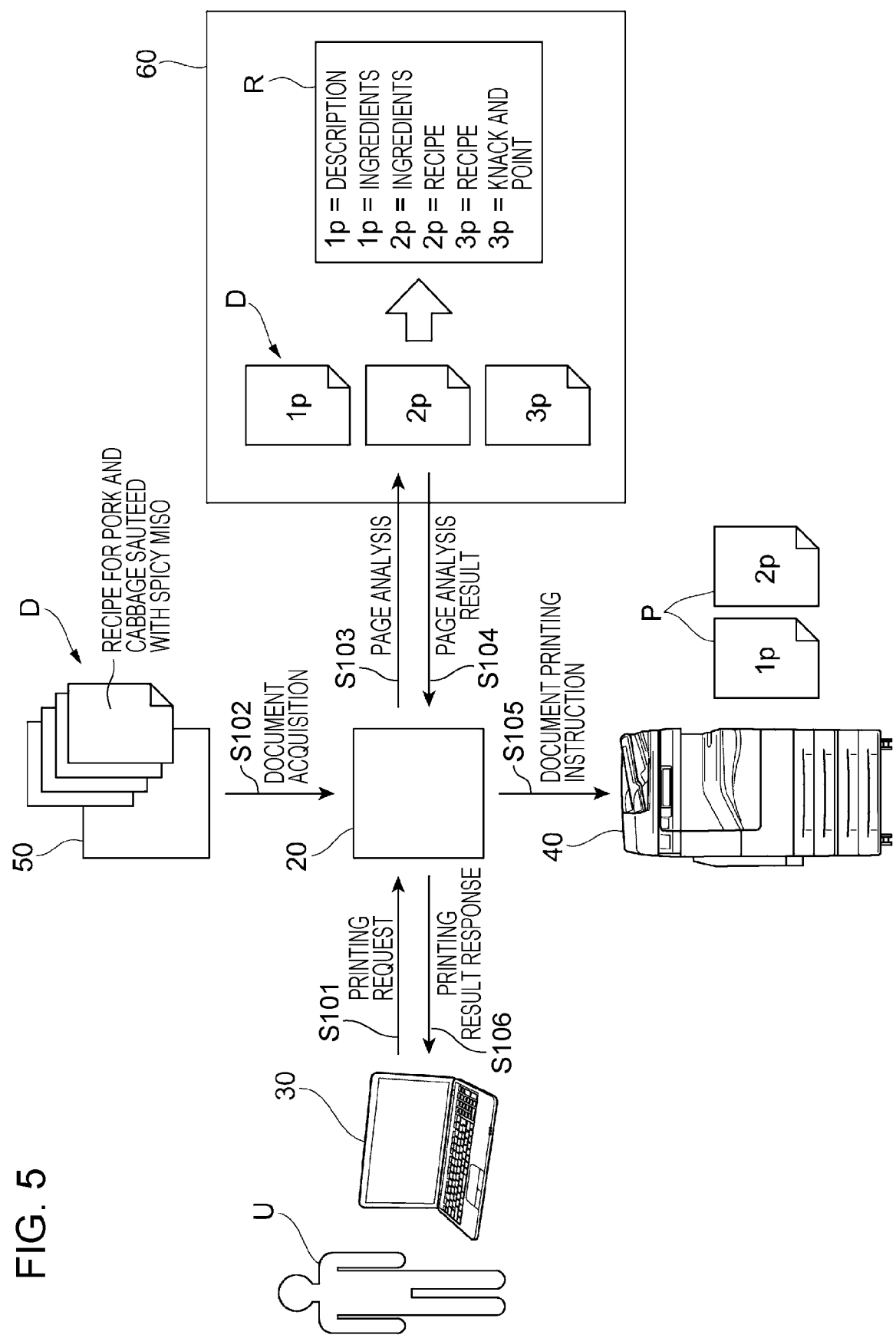
FIG. 5 is a diagram for explaining example outline operations performed by the printing system in response to a printing request from a personal computer (PC)

FIG. 5 illustrates example outline operations performed by the printing system 1 in response to a printing request from the PC 30. Although the PC 30 is used in FIG. 5, the apparatus is not limited to this. The operation panel 45 (see FIG. 4) included in the printer 40 or a mobile information terminal (not illustrated) may be used. The printing request is an example of an image forming instruction to form a processed image on the recording medium and may also be referred to as a printing instruction.

In FIG. 5, in response to a user U first giving an instruction to print "the page for ingredients for the recipe for pork and cabbage sauteed with spicy miso", the PC 30 transmits a printing request to the server 20 (step S101). The server 20 then acquires document data D describing the recipe for pork and cabbage sauteed with spicy miso from the document storage 50 (step S102) and requests the page analyzer 60 to analyze the pages of the document data D (step S103). In response to this, the page analyzer 60 generates a page analysis result R from the document data D, and the server 20 then acquires the page analysis result R (step S104) and transmits a printing instruction regarding the document data D to the printer 40 on the basis of the page analysis result R (step S105). In this example, the page analysis result R indicates that the ingredients are on the first and second pages, and thus the printer 40 prints a printed material P corresponding to the first and second pages of the document data D in accordance with the printing request. The server 20 thereafter transmits a printing result response to the PC 30 (step S106), and the PC 30 notifies the user U of printing completion by using an indicator.

As described above, in response to the printing request from the PC 30, the series of steps until printing is started. Suppose a case where in response to the printing request from the smart speaker 10, the series of steps is started like the case of the printing request from the PC 30. If the smart speaker 10 transmits the printing request in response to a speech of the user U, and the occurrence of a speech given by mistake by the user U or wrongly performed speech recognition causes the execution of printing not intended by the user U, thus resulting in a waste of supplies. The occurrence is assumed to cause the user U to refrain from using a printing service, and thus it becomes difficult to promote the use of the printing system 1.

Hence, first to third example outline operations in which a waste of the supplies may be prevented will be described in this exemplary embodiment.

FIGS. 6A and 6B each illustrate first example outline operations performed by the printing system 1 in response to a printing request from a corresponding one of the PC 30 and the smart speaker 10. FIG. 6A corresponds to FIG. 5 but is simplified for convenience of explanation. FIG. 6B is also simplified like FIG. 6A. The same holds true for FIGS. 7A, 7B, and 8 (described later).

In FIG. 6B, when speaking to the smart speaker 10, the user U typically utters a phrase to start using the speech assistant function of the smart speaker 10; however, the utterance is not illustrated in FIG. 6B. The same holds true for FIGS. 7A, 7B, and 8 (described later).

FIGS. 6A and 6B do not illustrate the server 20 but include communications directly performed between the printer 40 and the PC 30 and between the printer 40 and the smart speaker 10 and communications performed between the printer 40 and the PC 30 and between the printer 40 and the smart speaker 10 via the server 20. Hereinafter, an example in which the printer 40 performs processing is described; however, the server 20 may perform the processing. The same holds true for FIGS. 7A, 7B, and 8 (described later).

As illustrated in FIG. 6A, after the PC 30 transmits a printing request in response to input other than the user U's speech input (step S111), the printer 40 receives the document data D appropriate for the printing request (see FIG. 5), forms an image represented by the document data D on the recording medium in receiving order, and discharges a printed material P (step S112).

In contrast, as illustrated in FIG. 6B, in response to the user U giving a speech V21 "Print the page for ingredients for the recipe for pork and cabbage sauteed with spicy miso", the smart speaker 10 produces a speech V22 "Accepted. The print data will be accumulated in the printer".

The smart speaker 10 then transmits a printing request according to the user U's speech input (step S121). The printer 40 receives the document data D appropriate for the printing request (see FIG. 5) and accumulates the received document data D in the HDD 44 (step S122). Specifically, if the smart speaker 10 transmits the printing request, simply receiving the printing request does not cause the printed material P to be discharged, unlike the case of the printing request from the PC 30.

Thereafter, in response to receiving a notification of the document data D accumulation in the HDD 44 from the printer 40, the smart speaker 10 produces a speech V23 "To discharge the printed material, operate the printer". After the user U makes a request to discharge a printed material P by operating the operation panel 45 of the printer 40 in response to this, the printer 40 prints, on the recording medium, the image represented by the document data D accumulated in the HDD 44 (step S123) and discharges the printed material P (step S124).

In the first example outline operations as described above, if the printing request is transmitted from the PC 30 in response to the input other than the user U's speech input, the image represented by the document data D appropriate for the printing request is printed immediately, and the printed material P is discharged. In contrast, if the printing request is transmitted from the smart speaker 10 in response to the user U's speech input, the document data D is accumulated in the printer 40, and waiting for a printed-material discharge request is performed. In response to the printed-material discharge request from the operation panel 45 of the printer 40, the accumulated document data D is printed, and the printed material P is discharged. In the case of the printing request from the smart speaker 10, a printed-material discharge request made through, for example, operation of the PC 30 other than the user U's speech is required in addition to the printing request triggered by the user U's speech.

This enables prevention of the execution of printing not intended by the user U that is caused by a speech given by mistake by the user U or wrongly performed speech recognition and thus prevention of a waste of supplies.

The printing request from the smart speaker 10 transmitted in response to the user U's speech input is an example of a first instruction, and the printing request from the PC 30 transmitted in response to the input other than the user U's speech input is an example of a second instruction.

The printed-material discharge request is transmitted from the operation panel 45 in this exemplary embodiment; however, the disclosure is not limited to this. Any device that transmits a printed-material discharge request in response to input other than the speech input may be used, and, for example, the PC 30, a mobile information terminal (not illustrated), or the like may be used. In other words, the printed-material discharge request referred to here may be a request to print accumulated data.

In addition, the server 20 acquires the document data D from the document storage 50 and transmits the document data D to the printer 40 in this exemplary embodiment; however, the disclosure is not limited to this. The smart speaker 10 may acquire the document data D from the document storage 50 and transmit the acquired document data D to the printer 40 together with the printing request.

Additionally, the printed-material discharge request is transmitted to confirm the intention with the user U and is useful from the viewpoint of preventing a waste of supplies. However, the user U is required to operate an apparatus other than the smart speaker 10 again, and it is difficult to promote the use of the printing system 1 from the viewpoint of user-friendliness. Nevertheless, a probability that a speech given by mistake or wrongly performed speech recognition of concern occurs two times in succession is considered to be not high.

Hence, a configuration for accepting the printed-material discharge request from the smart speaker 10 may be used to promote the use of the printing system 1. In this case, it is conceivable that if the configuration for accepting the printed-material discharge request from the smart speaker 10 is used, the intention of the user U is vocally confirmed.

FIGS. 7A and 7B each illustrate second example outline operations performed by the printing system 1 in response to a printing request from the smart speaker 10 to discharge a corresponding one of cases where the printed material P has 12 sheets and where the printed material P has three sheets. In the second example outline operations, if the printing request is transmitted from the PC 30, steps are the same as those in FIG. 6A described above, and thus description thereof is omitted.

In the second example outline operations, a threshold for the sheet count of a printed material is predetermined. If the printed-material sheet count according to the printing request from the smart speaker 10 is lower than the threshold, the printing is performed immediately. In contrast, if the printed-material sheet count is higher than or equal to the threshold, the printing is not performed immediately, and document data D is accumulated in the HDD 44.

In the following description, the threshold in the second example outline operations is five sheets.

As illustrated in FIG. 7A, in response to the user U giving a speech V31 "Print the next year calendar from January to December", the smart speaker 10 transmits a printing request according to the user U's speech input (step S131).

The printer 40 acquires document data D appropriate for the printing request (see FIG. 5) and verifies a sheet count in the printing (step S132). That is, the printer 40 verifies that the sheet count is 12 and is not lower than the threshold of five sheets. In this case, the printer 40 does not perform the printing immediately and accumulates the document data D (see FIG. 5) in the HDD 44 (step S133).

In response to the notification of the accumulation of the document data D from the printer 40, the smart speaker 10 produces a speech V32 "The print data has been accumulated in the printer. To discharge the printed material, operate the printer".

Like FIG. 6B described above, in response to a printed-material discharge request by the user U, the accumulated document data D is printed on the recording medium (step S134), and the printed material P is discharged (step S135).

In contrast, as illustrated in FIG. 7B, after the smart speaker 10 transmits the printing request (step S141) in response to a speech V41 by the user U "Print the next year calendar from January to March", the printer 40 verifies that the sheet count is three and lower than the threshold of five sheets (step S142), performs the printing immediately without accumulation, and discharges the printed material P (step S143).

In response to receiving the notification of the discharge of the printed material P from the printer 40, the smart speaker 10 produces a speech V42 "Printed" and thus notifies the user U to that effect.

In the second example outline operations as described above, in response to the printing request from the smart speaker 10, the sheet count of the recording medium according to the printing request is compared with the predetermined threshold. If the sheet count is higher than or equal to the threshold, document data is accumulated without performing the immediate printing, and waiting for a printed-material discharge request is performed (see FIG. 7A). In contrast, if the sheet count is lower than the threshold, the printing is performed immediately without the accumulation (see FIG. 7B). User-friendliness may thereby be improved, and the use of the printing system 1 may be promoted.

Even if the printing request results from a speech given by mistake or wrongly performed speech recognition, the printing request may result in printing involved with a smaller sheet count of the printed material P. The immediate printing having a small influence of unnecessary printing may thereby be performed, while the immediate printing having a relatively large influence of the unnecessary printing is reduced. A waste amount of supplies may thereby be reduced.

In addition to the configuration in which the threshold is set in advance and is prevented from being changed by a user, the threshold may be set to allow the user to change the threshold freely. For example, one sheet may be set as the threshold to naturally cause the accumulation, like the first example outline operations. Alternatively, a threshold having a value considerably larger than a typical printed sheet count, for example, 100 sheets may be set as the threshold to naturally cause the immediate printing. Causing the user to decide the threshold may lead to improvement in the user-friendliness to the user.

In a detailed description, instead of causing the user to set the threshold, providing options of immediate printing of any document data (setting the threshold of one sheet) and accumulation of any document data (setting the threshold of 100 sheets) makes a setting operation easier. Not only the two options but also a configuration allowing the user to set any value as the threshold may be provided, as a matter of course.

Note that the printed-material sheet count is used for the threshold in the second example outline operations; however, the disclosure is not limited to this, and a page count may be used for the threshold. Whether the sheet count or the page count is used for the threshold depends on whether to perform the immediate printing in duplex printing. Accordingly, if the sheet count is used for the threshold, the smart speaker 10 may inquire of the user U whether to perform duplex printing or the like.

In the second example outline operations, the printer 40 makes a comparison with the threshold; however, the disclosure is not limited to this, and the server 20 may make the comparison.

Figure 8:
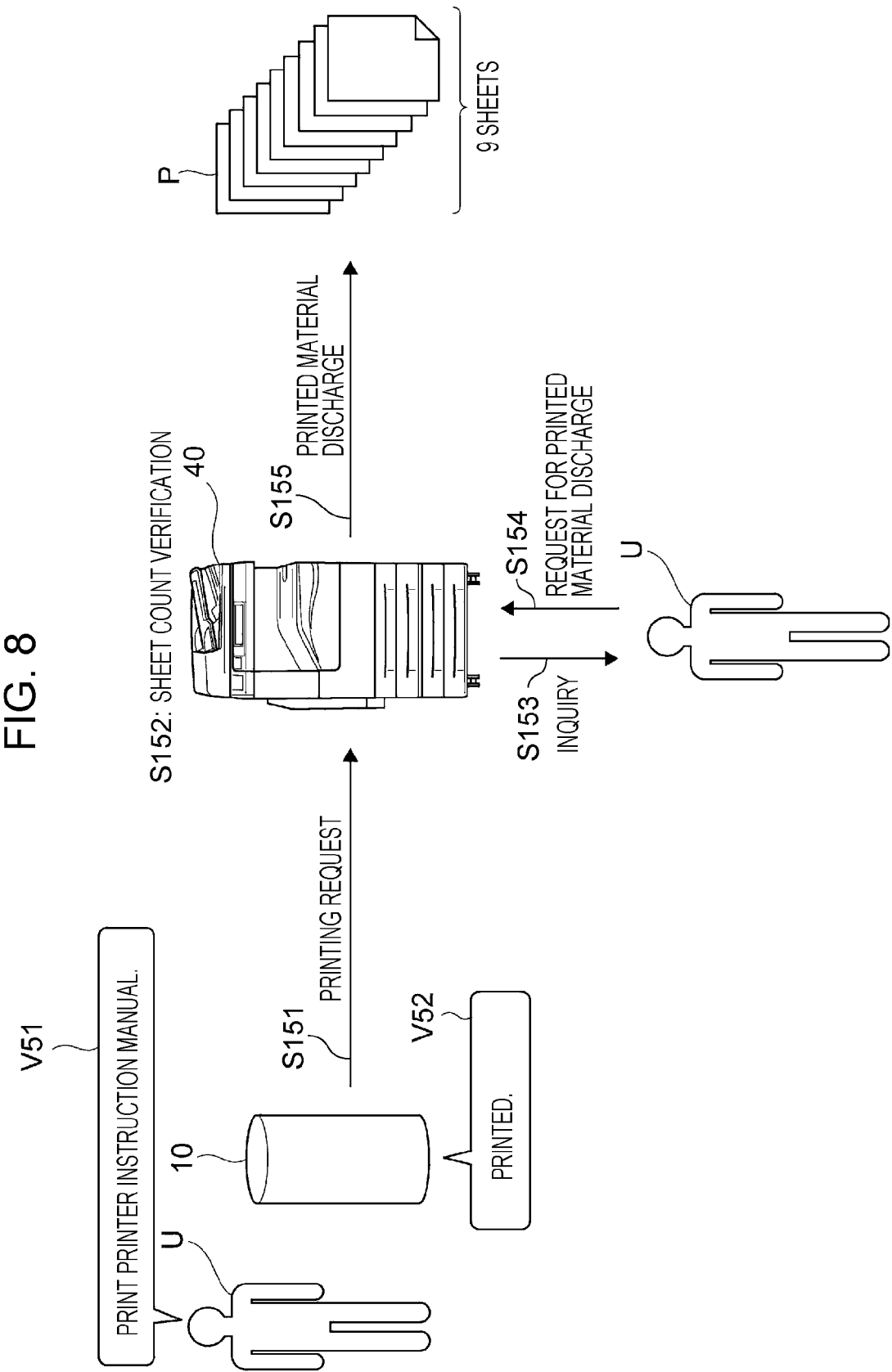
FIG. 8 illustrates third example outline operations performed by the printing system in response to a printing request from the smart speaker.

FIG. 8 illustrates third example outline operations performed by the printing system 1 in response to a printing request from the smart speaker 10. In the third example outline operations, if the printing request is transmitted from the PC 30, steps are the same as those in FIG. 6A described above, and thus description thereof is omitted.

In the third example outline operations, a threshold for the sheet count of a printed material is predetermined. If the printed-material sheet count according to the printing request from the smart speaker 10 is lower than a first threshold, printing is performed immediately. In contrast, if the printed-material sheet count is higher than or equal to the first threshold and is lower than a second threshold, whether to perform the printing immediately is inquired of the user U. If the printed-material sheet count is higher than or equal to the second threshold, document data D is accumulated in the HDD 44 without inquiring of the user U.

The following description is provided on the assumption that the first threshold in the third example outline operations is lower than the second threshold and is five sheets and that the second threshold is ten sheets.

As illustrated in FIG. 8, in response to the user U giving a speech V51 "Print the printer instruction manual", the smart speaker 10 transmits a printing request according to the user U's speech input (step S151). The printer 40 then verifies the printed-material sheet count according to the printing request (step S152).

After verifying that the sheet count is nine, that is, the sheet count is not lower than the first threshold, is higher than the first threshold, and is lower than the second threshold, the printer 40 notifies the user U of the printed-material sheet count and thereby inquires whether to perform printing immediately (step S153).

Inquiring of the user U by notifying the user U of the printed-material sheet count as described above leads to the printing system 1 that is user-friendly to the user U in the following case. Specifically, the user U thinks that the printed-material sheet count is about three that is lower than the first threshold. Actually, the sheet count is lower than the second threshold but is nine.

The inquiry to the user U is made by directing the inquiry to a notification destination, for example, a mail address acquired from user information included in the printing request from the smart speaker 10; however, the inquiry may be made by using the smart speaker 10.

After the user U makes a discharge request in response to the inquiry mail (step S154), the printer 40 performs the printing on the recording medium and discharges the printed material P (step S155). Thereafter, the smart speaker 10 produces a speech V52 "Printed" and thus notifies the user U to that effect.

The printed-material discharge request may be transmitted not only by replying to the inquiry mail but also by answering the inquiry in such a manner that the user U selects one of items "Execute printing" and "Cancel printing" in the body of the inquiry mail.

In addition, instead of or together with the speech V52, a report indicating the completion of the printing may be transmitted to the mail address of the inquiry mail.

In the printer 40, the steps in which the printing is performed immediately in response to the sheet count lower than the first threshold and the steps in which the accumulation is performed in response to the sheet count higher than or equal to the second threshold are the same as those in the second example outline operations described above (see FIG. 7A for printing the accumulated data and FIG. 7B for the immediate printing), and thus description thereof is omitted.

Functional Configuration of Server 20 or Printer 40

Figure 9:
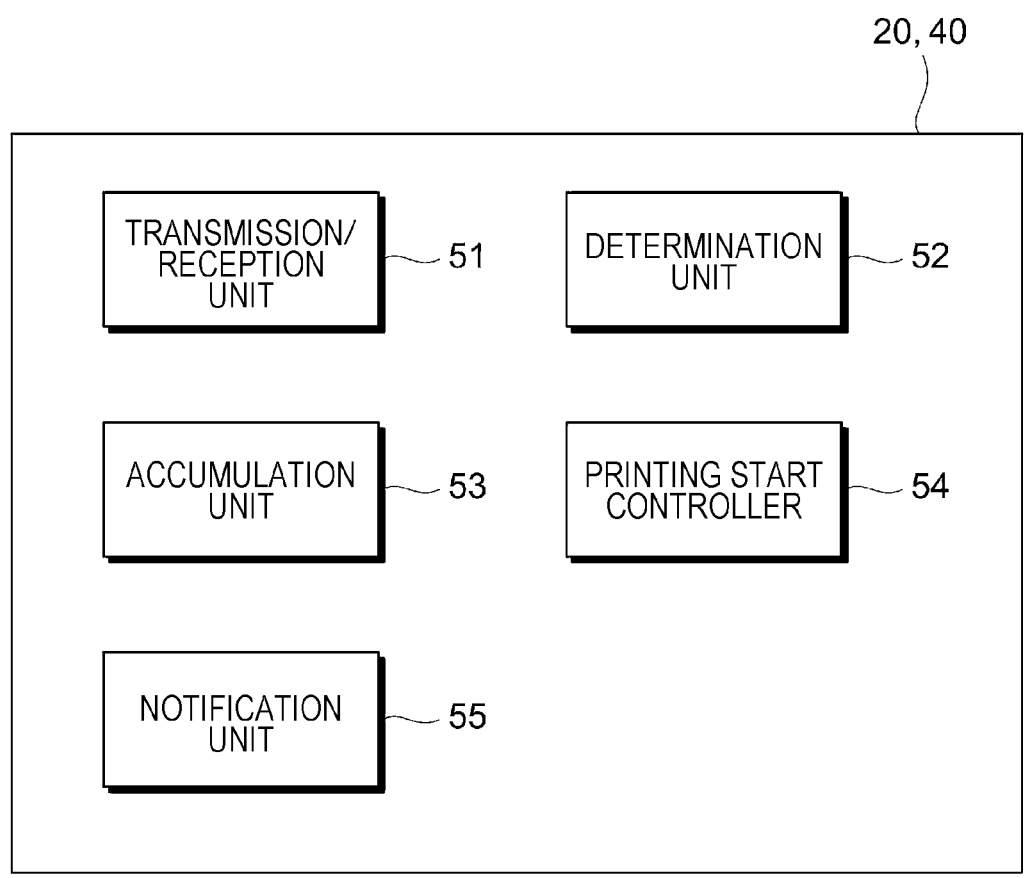
FIG. 9 is a block diagram illustrating an example functional configuration of the server or the printer in this exemplary embodiment.

FIG. 9 is a block diagram illustrating an example functional configuration of the server 20 or the printer 40 in this exemplary embodiment. Any one of the server 20 and the printer 40 may have the following example functional configuration.

As illustrated in FIG. 9, each of the server 20 and the printer 40 includes a transmission/reception unit 51, a determination unit 52, an accumulation unit 53, a printing start controller 54, and a notification unit 55.

The transmission/reception unit 51 receives information such as the printing request from the smart speaker 10 and the document data D and also transmits the information to the smart speaker 10. The transmission/reception unit 51 receives information such as the document data D and the printing request from the PC 30 and also transmits the information to the PC 30.

If the server 20 includes the transmission/reception unit 51, the transmission/reception unit 51 transmits and receives the information to and from the printer 40. If the printer 40 includes the transmission/reception unit 51, the transmission/reception unit 51 transmits and receives the information to and from the server 20.

The transmission/reception unit 51 is an example of a receiving unit.

The determination unit 52 determines whether the printing request received by the transmission/reception unit 51 has been transmitted from the smart speaker 10 or the PC 30. It is conceivable that the determination is performed in the following manners. The determination is performed on the basis of information included in the printing request and indicating that the printing request is transmitted from the smart speaker 10 (or information indicating that the printing request is not transmitted from the smart speaker 10). If the information is not included in the printing request, the printer 40 identifies the transmission source of the printing request.

The determination unit 52 also performs the determination by using information regarding a printed-material sheet count according to the printing request, that is, by using the document data D appropriate for the printing request.

Further, the determination unit 52 performs the determination by using printing settings information indicating, for example, monochrome printing. For example, the printing unit 46 of the printer 40 has the printing settings information. In this case, the determination unit 52 acquires the printing settings information from the printing unit 46 to perform the determination.

The determination unit 52 is an example of a restriction unit.

The accumulation unit 53 accumulates the document data D appropriate for the printing request when the document data D is not printed immediately. The document data D accumulated by the accumulation unit 53 may be image data resulting from document rasterization or may be document data before the rasterization.

If the printer 40 includes the accumulation unit 53, the accumulation unit 53 is the HDD 44 of the printer 40 (see FIG. 4). If the server 20 includes the accumulation unit 53, the accumulation unit 53 is the HDD 23 or the like of the server 20 (see FIG. 3).

The accumulation unit 53 is an example of a storage unit.

The printing start controller 54 performs control as to whether to perform printing immediately in response to the transmission/reception unit 51 receiving the document data D appropriate for the printing request or to temporarily accumulate the document data D in the accumulation unit 53 and then perform printing in response to a printed-material discharge request. If the server 20 includes the printing start controller 54, the printing start controller 54 instructs the printer 40 to start the printing. If the printer 40 includes the printing start controller 54, the printing start controller 54 instructs the printing unit 46 (see FIG. 4) to start the printing.

The notification unit 55 notifies the user U of the inquiry mail described above notifying the printed-material sheet count according to the printing request and inquiring whether to perform the printing immediately. The transmission/reception unit 51 receives a reply from the user U to the inquiry mail.

If user information regarding the user U who has made the printing request is embedded in the printing request, and if the notification unit 55 stores a table having the user information and a destination that are connected with each other, the address or the notification destination of the inquiry mail from the notification unit 55 is identified by using the table.

The notification unit 55 may also inquire of the user U by using the smart speaker 10. The smart speaker 10 in this case is an example of an apparatus that transmits the first instruction.

Operations of Server 20 or Printer 40

FIGS. 10 to 14 are flowcharts for explaining first to fourth example operations of this exemplary embodiment, and some of the figures also correspond to the foregoing example outline operations (see FIGS. 6A to 8). FIGS. 10 to 14 include mutually common steps, and thus description thereof is omitted on occasions.

First Example Operations

Figure 10:
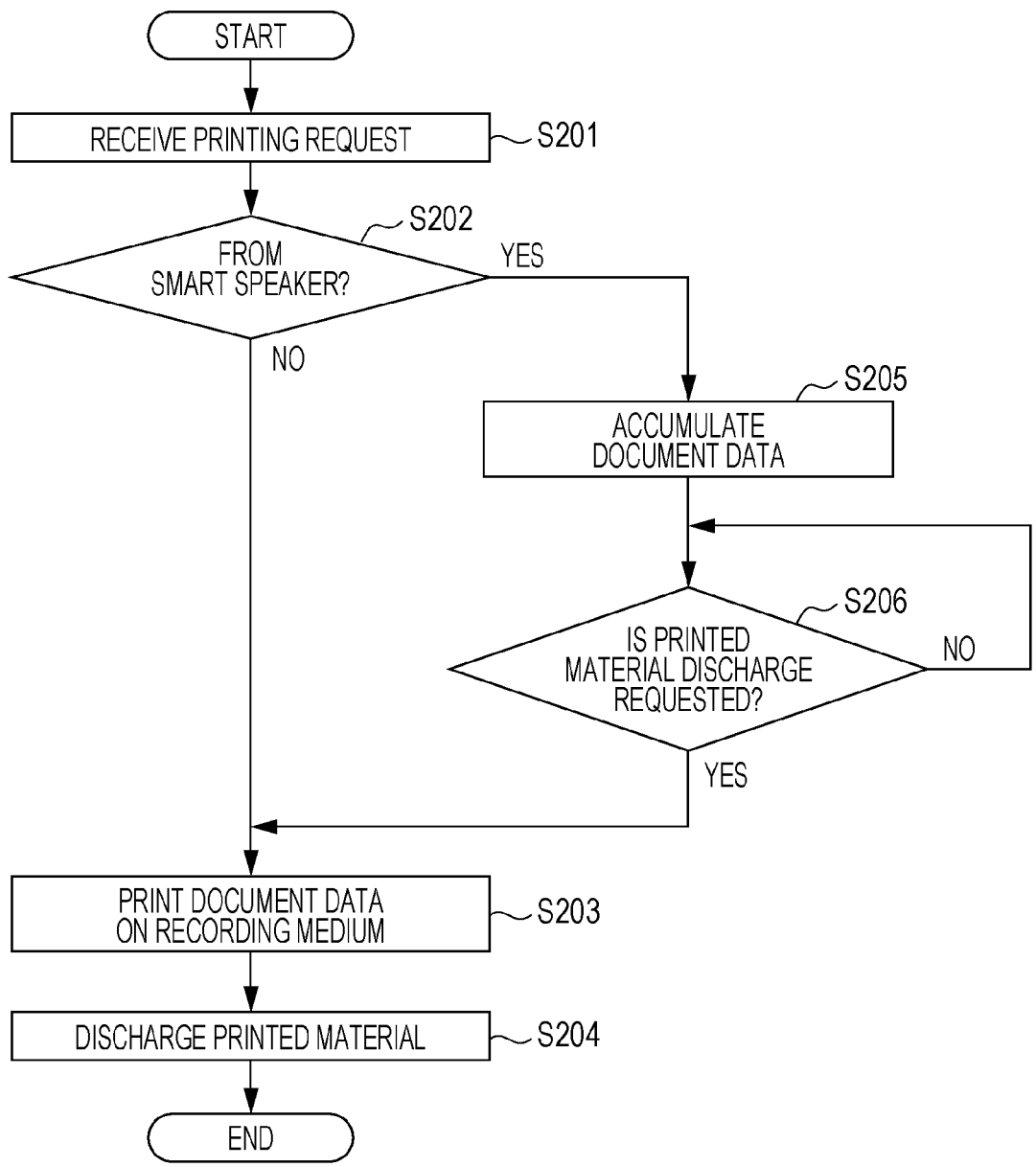
FIG. 10 is a flowchart illustrating first example operations of the server or the printer in this exemplary embodiment.

FIG. 10 is a flowchart illustrating the first example operations of the server 20 or the printer 40 in this exemplary embodiment, and some of the steps therein correspond to those in the foregoing first example outline operations (see FIG. 6).

After the transmission/reception unit 51 (see FIG. 9) receives a printing request (step S201), the determination unit 52 (see FIG. 9) determines whether the printing request is transmitted from the smart speaker 10 or the PC 30 (step S202).

If the printing request is not transmitted from the smart speaker 10, that is, transmitted from the PC 30, (No in step S202), the printing start controller 54 (see FIG. 9) instructs the printing unit 46 of the printer 40 to start printing. The printing start instruction is given for document data D that is received by the transmission/reception unit 51 and that is considered to be appropriate for the printing request.

The printing unit 46 of the printer 40 prints the document data D on the recording medium in accordance with the printing start instruction (step S203) and discharges a printed material P (step S204). Specifically, the printing is performed immediately. The process is thereby terminated.

In contrast, if the printing request is transmitted from the smart speaker 10 (Yes in step S202), the accumulation unit 53 (see FIG. 9) accumulates the document data D received by the transmission/reception unit 51 (step S205). Specifically, the document data D is not printed immediately and is temporarily accumulated in the accumulation unit 53.

The transmission/reception unit 51 determines whether the discharging of the printed material P is requested from the user U (step S206).

If the discharging of the printed material P is requested (Yes in step S206), the process proceeds to step S203. Specifically, the printing start controller 54 instructs the printing unit 46 of the printer 40 to start printing of the accumulated data. In response to this, the printing unit 46 prints the accumulated data on the recording medium (step S203) and discharges the printed material P (step S204). Specifically, the printing unit 46 performs the printing in response to the discharge request after the accumulation, and then the process is terminated.

If the discharging of the printed material P is not requested (No in step S206), waiting is performed. Wait time may be predetermined, and after the elapse of the predetermined time, the printing start controller 54 may perform a cancellation process for cancelling the printing request. If the cancellation process is executed, the smart speaker 10 notifies to that effect.

Second Example Operations

Figure 11:
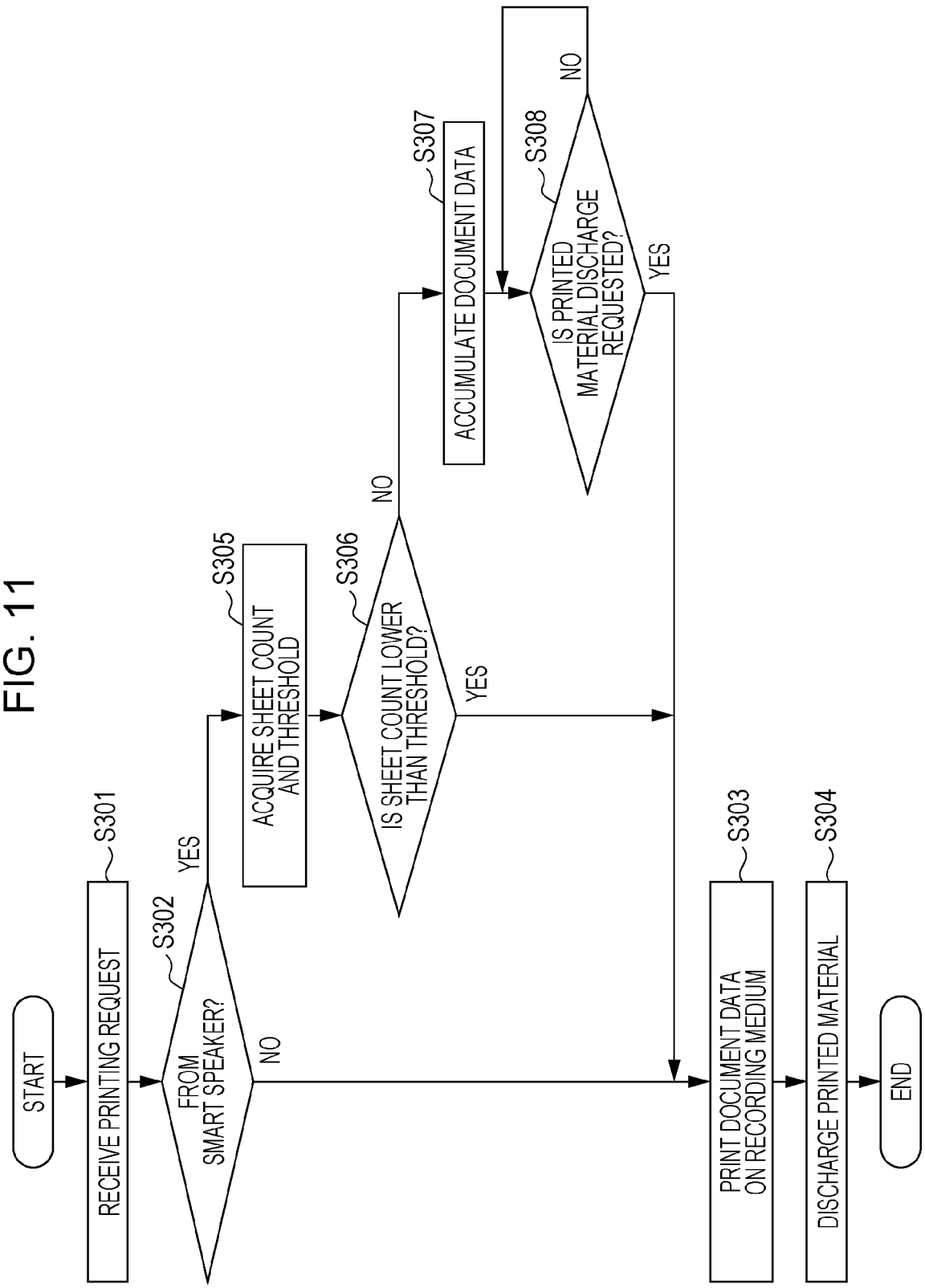
FIG. 11 is a flowchart illustrating second example operations of the server or the printer in this exemplary embodiment.

FIG. 11 is a flowchart illustrating the second example operations of the server 20 or the printer 40 in this exemplary embodiment and corresponds to the foregoing second example outline operations (see FIG. 7). Since steps S301 to S304, S307, and S308 are respectively common to steps S201 to S206 (see FIG. 10) in the first example operations, and thus description thereof is omitted on occasions.

If the printing request is transmitted from the smart speaker 10 (Yes in step S302), the determination unit 52 acquires the sheet count of the printed material P in printing the document data D appropriate for the printing request on the recording medium and also acquires the predetermined threshold (step S305). The determination unit 52 acquires the sheet count by checking the document data D by itself. Alternatively, if the sheet count is added to the document data D, the determination unit 52 acquires the sheet count from the added information in the document data D.

The threshold referred to here is an example of a threshold included in a predetermined condition, and the sheet count referred to here is an example of a sheet count of a recording medium in image forming on the recording medium.

The determination unit 52 makes a comparison between the sheet count and the threshold that are acquired and determines whether the sheet count is lower than the threshold (step S306). If the sheet count is lower than the threshold (Yes in step S306), the process proceeds to step S303. The document data D is printed on the recording medium (step S303), and the printed material P is discharged (step S304).

If the sheet count is not lower than the threshold (No in step S306), the process proceeds to step S307. Specifically, the document data D is accumulated (step S307). Waiting is performed until the discharge of the printed material P is requested from the user U (No in step S308). In response to the discharge request (Yes in step S308), the process proceeds to step S303. The accumulated data is printed on the recording medium (step S303), and the printed material P is discharged (step S304).

The case where the sheet count is lower than the threshold (Yes in step S306) is an example of satisfaction of the predetermined condition.

Modification of Second Example Operations

In the second example operations, if the sheet count is lower than the threshold (Yes in step S306), the printing is performed immediately. However, this is not user-friendly to a user U who often performs large-volume printing having a high printed-material sheet count through a printing request from the smart speaker 10. This is because the printing request is regarded as a printing request involved with a high printed-material sheet count, and the document data D is accumulated every printing request without performing the immediate printing. The printing is not performed unless the user U performs an additional operation for a printed-material discharge request every time.

In a modification of the aspect in which whether to restrict image forming on the recording medium is determined by using the threshold for the sheet count, the printing may be performed immediately if the sheet count is higher than or equal to the threshold.

Figure 12:
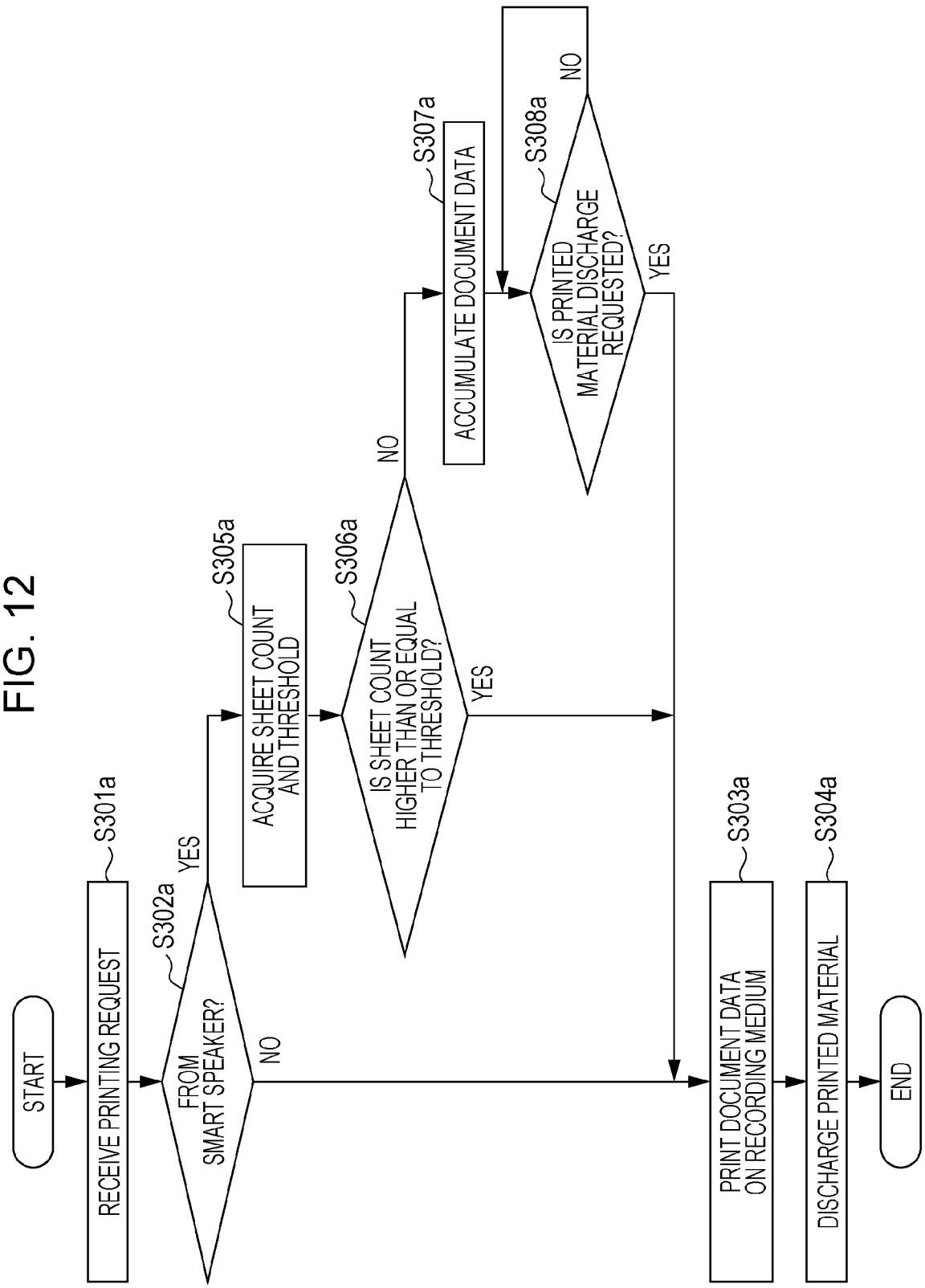
FIG. 12 is a flowchart illustrating a modification of the second example operations of the server or the printer in this exemplary embodiment.

FIG. 12 is a flowchart illustrating a modification of the second example operations of the server 20 or the printer 40 in this exemplary embodiment. FIG. 12 illustrates steps common to those in the second example operations illustrated in FIG. 11, and thus the description thereof is omitted on occasions. To clearly discriminate the steps in FIG. 12 from the second example operations illustrated in FIG. 11, FIG. 12 has step numbers in FIG. 11 each followed by "a".

In the modification in FIG. 12, the determination unit 52 makes a comparison between the sheet count and the threshold that are acquired and determines whether the sheet count is higher than or equal to the threshold (step S306a). If the sheet count is higher than or equal to the threshold (Yes in step S306a), the process proceeds to step S303a. The document data D is printed on the recording medium (step S303a), and the printed material P is discharged (step S304a).

If the sheet count is lower than the threshold (No in step S306a), the process proceeds to step S307a. Specifically, the document data D is accumulated (step S307a). Waiting is performed until the discharge of the printed material P is requested from the user U (No in step S308a). In response to the discharge request (Yes in step S308a), the process proceeds to step S303a. The accumulated data is printed on the recording medium (step S303a), and the printed material P is discharged (step S304a).

The case where the sheet count is higher than or equal to the threshold (Yes in step S306a) is an example of the satisfaction of the predetermined condition.

A conceivable way of preventing a waste of the supplies caused by the execution of large-volume printing not intended by the user U is, for example, adding another condition for performing the immediate printing.

For example, printing settings information used in the fourth example operations (described later) is used as the condition. Specifically, control is performed to allow large-volume printing in the case of monochrome printing. Control in which the smart speaker 10 inquires of the user U by notifying the user U of the sheet count of a printed material may also be used.

Third Example Operations

FIG. 13 is a flowchart illustrating the third example operations of the server 20 or the printer 40 in this exemplary embodiment and corresponds to the foregoing third example outline operations (see FIG. 8). Since steps S401 to S404, S408, and S409 are respectively common to steps S201 to S206 (see FIG. 10) in the first example operations, and thus description thereof is omitted on occasions.

If the printing request is transmitted from the smart speaker 10 (Yes in step S402), the determination unit 52 acquires a printed-material sheet count according to the printing request, a predetermined first threshold, and a predetermined second threshold (step S405).

The first threshold has a value lower than that of the second threshold. The first threshold and the second threshold referred to here are respective examples of a first threshold and a second threshold.

The determination unit 52 determines whether the acquired sheet count is: lower than the first threshold; higher than or equal to the first threshold and also lower than the second threshold; or higher than or equal to the second threshold. A step based on the determination result is then performed. Specifically, the determination unit 52 makes a comparison between the sheet count and the first threshold that are acquired and determines whether the sheet count is lower than the first threshold (step S406). If the sheet count is lower than the first threshold (Yes in step S406), the printing is performed immediately (steps S403 and S404).

If the sheet count is higher than or equal to the first threshold (No in step S406), the determination unit 52 determines whether the sheet count is lower than the second threshold (step S407).

If the sheet count is higher than or equal to the second threshold (No in step S407), the document data D is temporarily stored in the accumulation unit 53 without being printed immediately, and waiting for a discharge request is performed (steps S408 and S409).

If the sheet count is lower than the second threshold (Yes in step S407), the notification unit 55 (see FIG. 9) notifies the user U of the printed-material sheet count and inquiries whether to execute or cancel the printing (step S410).

The inquiry referred to here is an example of inquiring of the user whether to allow image forming on the recording medium without performing the restriction. The printed-material sheet count referred to here is an example of information regarding the sheet count of the recording medium in the image forming on the recording medium.

As described above, the inquiry may be made by using the inquiry mail or the smart speaker 10.

The transmission/reception unit 51 determines whether a printing cancellation reply is received from the user U as a reply to the inquiry (step S411). If a printing cancellation reply is received (Yes in step S411), print data, that is, the document data D is deleted (step S412), and then the process is terminated.

If a printing cancellation reply is not received (No in step S411), that is, if a printing execution reply is received, the printing is performed immediately (steps S403 and S404).

Fourth Example Operations

FIG. 14 is a flowchart illustrating fourth example operations of the server 20 or the printer 40 in this exemplary embodiment. In the fourth example operations, a process is executed by using printing settings information. Since steps S501 to S504, S507, and S508 are respectively common to steps S201 to S206 (see FIG. 10) in the first example operations, and thus description thereof is omitted on occasions.

If the printing request is transmitted from the smart speaker 10 (Yes in step S502), the determination unit 52 acquires printing settings information (step S505). The printing settings information is settings information to be used when the printing unit 46 performs printing. In the fourth example operations, the printing settings information is information indicating whether the printing is monochrome printing or color printing.

The information indicating whether the printing is monochrome printing or color printing referred to here is an example of an image forming setting for the image forming on the recording medium.

The determination unit 52 determines whether the printing is monochrome printing (step S506). If the printing is monochrome printing (Yes in step S506), the printing is performed immediately (steps S503 and S504). If the printing is not monochrome printing (No in step S506), the printing is not performed immediately, the document data D is temporarily accumulated in the accumulation unit 53, and waiting for a discharge request is performed (steps S507 and S508).

As described above, the immediate printing in the monochrome printing in which the supplies are less consumed than in color printing is performed regardless of the printed-material sheet count. An influence of a consumption amount in unnecessary printing may thereby be reduced, and user-friendliness may also be improved.

The monochrome printing (Yes in step S506) is an example of the satisfaction of the predetermined condition.

In the fourth example operations, the settings information indicating whether the printing is monochrome printing or color printing is used as the printing settings information; however, the disclosure is not limited to this. For example, settings information indicating whether printing is duplex printing, the count of a printed document page per recording medium page, or the like. From the viewpoint of reducing the influence of a consumption amount in unnecessary printing and also improving user-friendliness, conditions for immediate printing and printing after the accumulation may be set.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The processes executed by the server 20 in this exemplary embodiment are provided as a program such as application software.

In other words, the program implementing this exemplary embodiment is regarded as a program causing a computer to execute a process including: receiving a first instruction given in response to speech input by a user and a second instruction given in response to input other than the speech input by the user, the first instruction and the second instruction each serving as an image forming instruction to form a processed image on a recording medium; performing restriction of image forming in which the image is to be formed on the recording medium, the restriction being performed in response to receiving the first instruction in the receiving; and storing the image subjected to the restriction of the image forming on the recording medium, the restriction being performed in the performing of the restriction.

The program implementing this exemplary embodiment may be provided not only through a communication medium but also in such a manner as to be stored in a recording medium such as a compact disc (CD)-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printing system comprising:
at least one processor configured to implement:
a receiving unit that receives an image forming instruction to form an image on a recording medium;
a restriction unit that, in response to the received image forming instruction being in response to speech input by a user, performs a restriction of image forming instructed by the image forming instruction and, in response to the received image forming instruction being in response to input other than any speech input by the user, allows the image forming instruction to be executed without performing the restriction of the image forming; and
a storage configured to store the image subjected to the restriction, in response to the restriction being performed by the restriction unit, wherein the restriction unit, in response to a predetermined condition being satisfied, allows the image forming instruction to be executed without performing the restriction, and wherein the restriction unit determines whether to perform the restriction or to allow the image forming instruction to be executed by comparing a threshold included in the predetermined condition and a sheet count of the image forming instruction.

2. The printing system according to claim 1, wherein the restriction unit releases the restriction, in response to a request from the user to discharge the recording medium on which the image has been formed.

3. The printing system according to claim 2, wherein the request from the user is received at an apparatus different from an apparatus that received the speech input by the user.

4. The printing system according to claim 1, wherein the restriction unit, in response to the sheet count being lower than the threshold, allows the image forming instruction to be executed without performing the restriction.

5. The printing system according to claim 1, wherein the restriction unit, in response to the sheet count being higher than or equal to the threshold, allows the image forming instruction to be executed without performing the restriction.

6. The printing system according to claim 1, wherein the predetermined condition comprises an image forming setting for the image forming.

7. The printing system according to claim 6, wherein monochrome printing is set as the image forming setting.

8. The printing system according to claim 1, wherein the restriction unit:
in response to the received image forming instruction being in response to speech input by the user, acquires information identifying a sheet count of the image forming instruction;
in response to the sheet count being lower than a first threshold, allows the image forming instruction to be executed without performing the restriction; and
in response to the sheet count being higher than or equal to the first threshold, and being lower than a second threshold that is lower than the first threshold, inquires of a user whether to allow the image forming instruction to be executed without performing the restriction.

9. The printing system according to claim 8, wherein the restriction unit inquires of the user by transmitting the acquired information identifying the sheet count to an apparatus that transmitted the image forming instruction.

10. The printing system according to claim 8, wherein the restriction unit inquires of the user by transmitting the acquired information identifying the sheet count to a predetermined notification destination of the user.

11. An information processing apparatus comprising:
a processor configured to:
receive an image forming instruction to form an image on a recording medium;
perform a restriction of image forming instructed by the image forming instruction in response to the received image forming instruction being in response to speech input by a user;
allow the image forming instruction to be executed without performing the restriction of the image forming, in response to the received image forming instruction being in response to input other than any speech input by the user;
store the image subjected to the restriction in response to the restriction being performed;
in response to a predetermined condition being satisfied, allowing the image forming instruction to be executed without performing the restriction; and
determining whether to perform the restriction or to allow the image forming instruction to be executed by comparing a threshold included in the predetermined condition and a sheet count of the image forming instruction.

12. A non-transitory computer readable medium storing a program, which if executed, causes an information processing apparatus to execute a process comprising:
receiving an image forming instruction to form an image on a recording medium;
performing a restriction of image forming instructed by the image forming instruction in response to the received image forming instruction being in response to speech input by a user;
allow the image forming instruction to be executed without performing the restriction of the image forming, in response to the received image forming instruction being in response to input other than any speech input by the user; and
storing the image subjected to the restriction in response to the restriction being performed;
in response to a predetermined condition being satisfied, allowing the image forming instruction to be executed without performing the restriction; and
determining whether to perform the restrict on or to allow the image forming instruction to be executed by comparing a threshold included in the predetermined condition and a sheet count of the image forming instruction.

* * * * *